5 Sheets—Sheet 1.
H. F. HAYDEN.
Locomotive and other Furnaces.
No. 220,614. Patented Oct. 14, 1879.
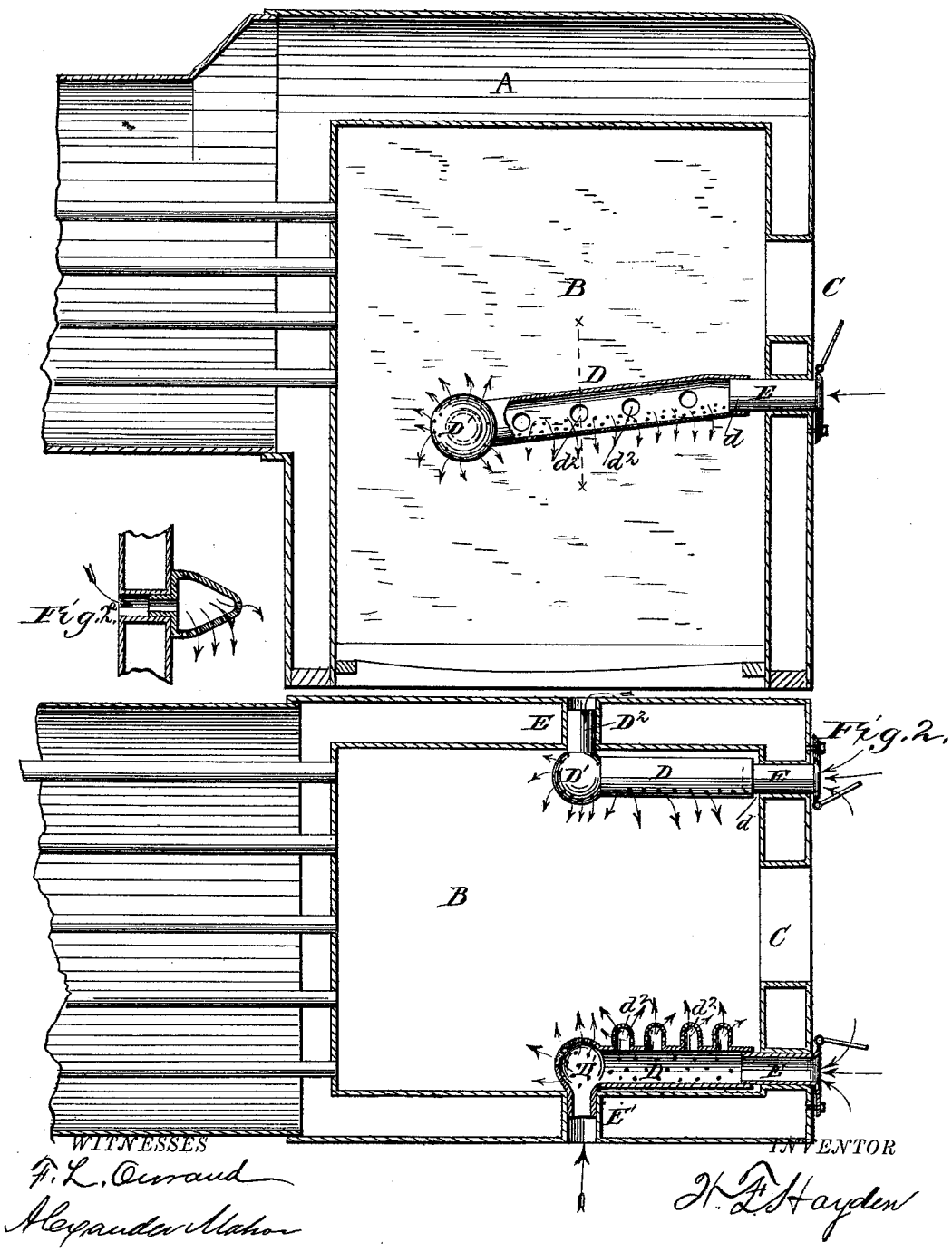

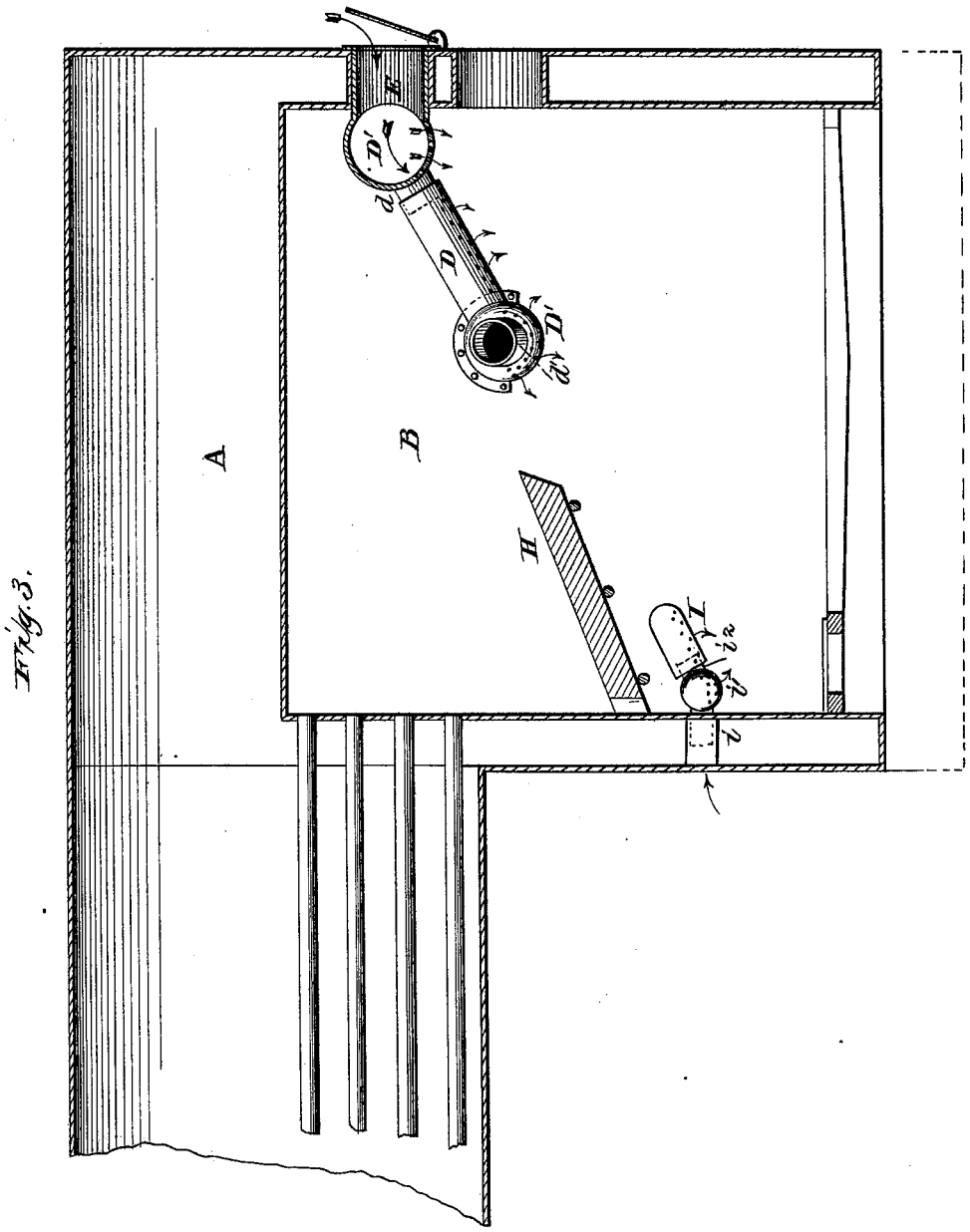

H. F. HAYDEN.
Locomotive and other Furnaces.
No. 220,614. Patented Oct. 14, 1879.
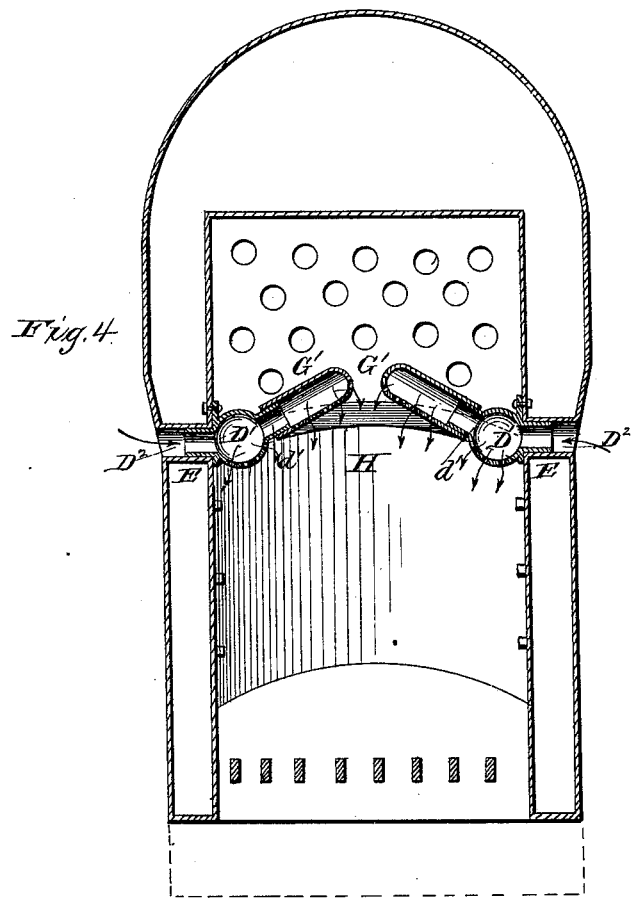
WITNESSES
INVENTOR 5 Sheets—Sheet 4

H. F. HAYDEN.
Locomotive and other Furnaces.

No. 220,614. Patented Oct. 14, 1879.

WITNESSES

INVENTOR

5 Sheets—Sheet 5.

H. F. HAYDEN.
Locomotive and other Furnaces.

No. 220,614. Patented Oct. 14, 1879.

WITNESSES

INVENTOR

UNITED STATES PATENT OFFICE.

HENRY F. HAYDEN, OF WASHINGTON, DISTRICT OF COLUMBIA.

IMPROVEMENT IN LOCOMOTIVE AND OTHER FURNACES.

Specification forming part of Letters Patent No. 220,614, dated October 14, 1879; application filed February 27, 1879.

*To all whom it may concern:*

Be it known that I, HENRY F. HAYDEN, of the city and county of Washington, District of Columbia, have invented certain new and useful Improvements in Locomotive and other Furnaces, of which the following is a full, clear, and exact description, reference being had to the accompanying drawings, making part of this specification, in which—

Figure 1 represents a vertical longitudinal section through a furnace, showing my improvements applied. Fig. 2 is a horizontal section through the same, and Fig. $2^a$ is a transverse section through one of the air-distributing pipes, showing the arrangement of the perforations and a modification in the form of the pipe. Figs. 3, 4, 5, 6, 7 are sectional views, and Fig. 8 an elevation, all showing modifications in the arrangement of the air ducts and distributers, hereinafter explained.

Similar letters of reference denote corresponding parts wherever used.

My invention relates to a novel arrangement of air-distributing pipes within a furnace, for promoting combustion, being an improvement upon the invention described in former patents, more particularly upon that embraced in the patent of December 25, 1877, No. 198,613.

The arrangement will be understood from the following description, with reference to the drawings, in which A represents a boiler of the form known as a "locomotive-boiler;" but my improvements, as will be apparent, while particularly designed for use in connection with furnaces of that class, can be applied with equal advantage to other forms. B is the fire-box; C, the fire-box door, and D D, the main air-distributing pipes. These pipes extend along the side walls of the fire-pot, reaching from the rear or fire-door end of the same to a point at or near midway of the length of the furnace, and, by preference, set inclining downward from said rear wall, as shown in Figs. 1 and 3. The rear ends of these pipes are open, adapting them to slide over and to fit snugly upon sleeves or ducts E, penetrating the rear wall of the furnace and the water-jacket to the same, and provided on their outer ends with valves for controlling the admission of air.

Figure 6:
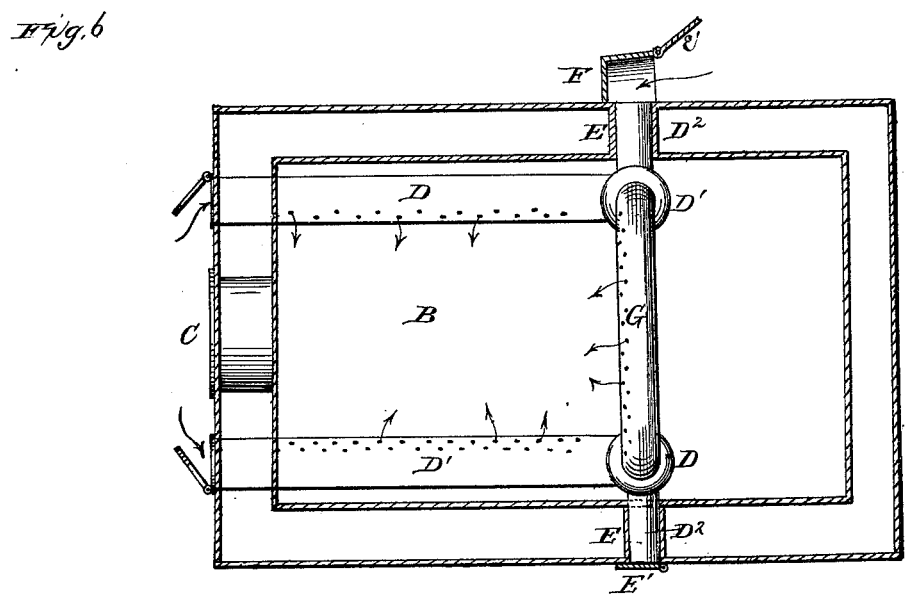

The forward ends of the pipes D terminate, by preference, in spherical or hemispherical distributers $D^1$, which, on the side adjacent to the side wall of the fire-pot, are provided with lateral pipes or sleeves $D^2$, which penetrate said side walls, as shown, passing through sleeves or side ducts $E'$, the pipes $D^2$ being made, if desired, to project beyond the outer wall, and being supplied either with valves only for controlling the admission of air, or with hoods F, for gathering and forcing the air into the distributing-pipes, and with valves $e'$ for controlling the amount admitted or permitted to be forced inward, as shown in Fig. 6. By this arrangement it will be seen that air can be forced in any required quantity directly into the part of the distributer exposed to the greatest heat, and thus made to counteract the destructive action of the fire upon that part of the distributer. This has been found of great service in practice, in preventing the burning out of the pipes at those points most exposed to the fire, besides giving a greatly-increased supply of air at points where it is most needed for promoting combustion.

The construction of the joint at $d$, between the distributer D and the supply-pipe E, as explained, provides for the expansion and contraction of the distributer, and thus adds to its durability.

Figure 8:
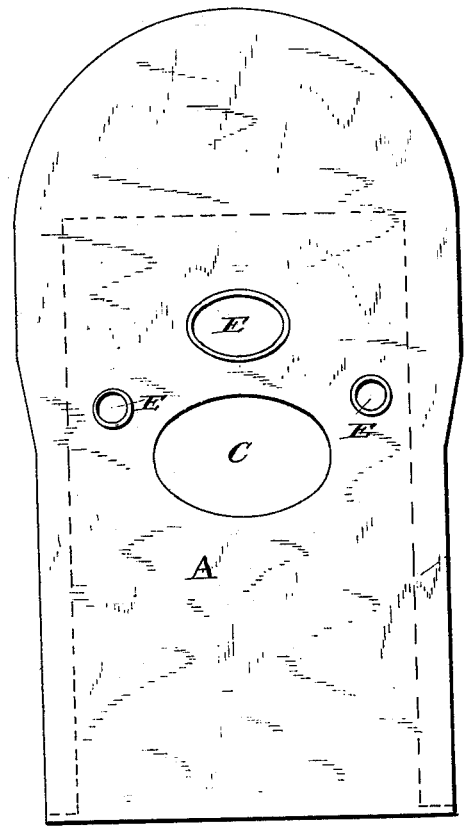
Figure 7:
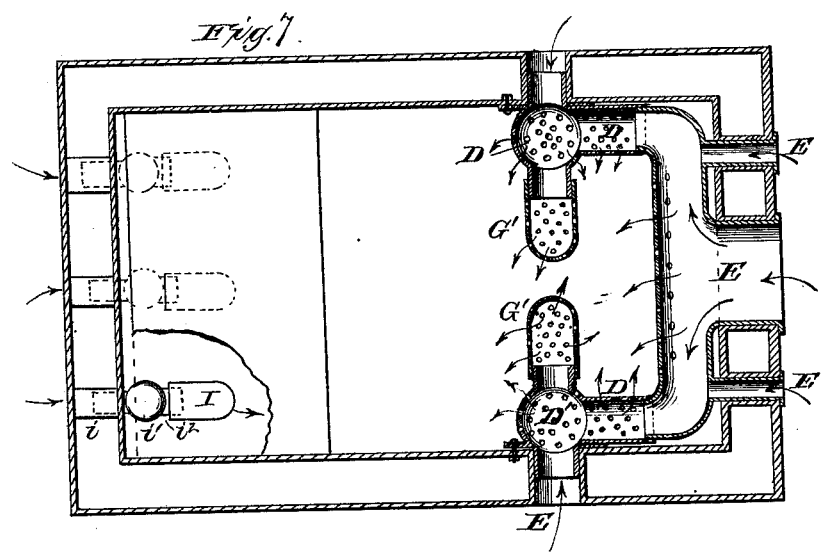

The supply-ducts E may be arranged at the sides of the fire-door, as shown in Fig. 6, below the same, as shown in Fig. 1, or at the sides and above, either or both, as shown in Figs. 7 and 8.

Figure 5:
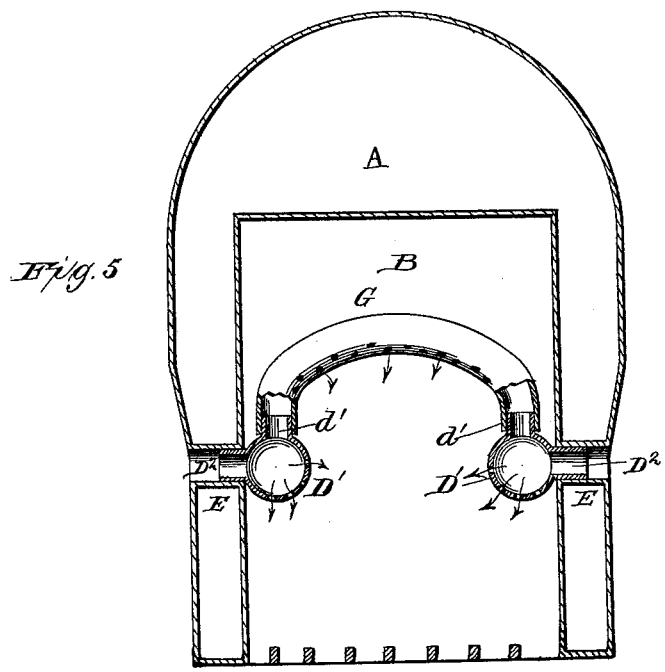

G (see Figs. 5 and 6) represents a pipe made in arching form, and extending across the fire-pot between the bulbs or spherical distributing-chambers $D^1$ $D^1$, and connected therewith through short upright sleeves $d^1$ $d^1$, as shown in Fig. 5. This pipe, where the usual brick arch is employed, is arranged, by preference, just back of the arch, in the path of the rising products of combustion, for supplying air thereto. It is made of a diameter sufficient to permit its ends to pass over the sleeves $d^1$ $d^1$, as shown, and being retained thereon only by its own gravity, can be removed and replaced by a new one, if necessary, without drawing the fire.

The relation of this pipe to the arch is shown in Figs. 4 and 5, where H represents the arch, and $G'$ the pipe or pipes, which, in this instance, instead of being made to extend across the furnace, as in Figs. 5 and 6, extend from each distributing-chamber nearly to the center, and there terminate in rounded perforated ends.

In the latter arrangement the sleeves $d^1$ may be set obliquely on the chamber $D^1$, and the short pipe, made in the form of perforated cups, (see Figs. 4 and 8,) can be placed readily on them, and when so placed will be retained without fastening.

The pipe G or cups G' can be made of cast metal, or of fire-clay or other refractory material calculated to withstand the heat of the fire at that part of the furnace where they are applied. They are perforated to permit the discharge of air in numerous minute jets, and in directions for best causing the air to mingle and mix thoroughly with the rising products of combustion.

The pipes D, before described, in addition to the usual perforations, may be provided with a series of cup-shaped lateral projections, also perforated, as shown at $d^2$, Fig. 2, for increasing the area over which the air may be spread in the furnace.

In addition to the arrangement of distributers above described, the front water leg or wall of the fire-pot may be perforated to receive sleeves $i$, having spherical bulbs $i^1$ on their inner ends, and these in turn provided with obliquely-arranged sleeves $i^2$, for the reception and retention of cups I, similar to those at G', above described, said bulbs $i^1$ and cups I being also perforated, as shown, for distributing the air in minute jets among the rising products of combustion, the object being to supply air at all points in the furnace where it is required to promote the combustion of the fuel.

The cups I are shown arranged at the foot of the arch H, underneath the same; but they may also be placed at other points where required for the purpose explained.

Having now described my invention, what I claim as new, and desire to secure by Letters Patent, is—

1. The side distributing-pipes, D D, having supply-ducts penetrating the rear wall of the furnace, in combination with supply pipes or ducts at their forward or inner ends, penetrating the side walls of the fire-pot, substantially as described.

2. The side distributing-pipes, in combination with the spherical distributing-chambers or bulbs $D^1$, applied to their forward ends, and having the lateral supply-ducts, as described.

3. The spherical chambers or bulbs $D^1$, on the inner or forward ends of the side distributing-pipes, D, arranged as shown, and provided with open sleeves or collars, for the reception of and in combination with transverse distributing-pipes, substantially as described.

4. The combination of the side distributing-pipes, D D, and the transverse arching pipe G, applied and operating substantially as described.

5. The combination of the side pipes, D, having the supply-pipes or ducts at their rear and forward ends, the latter penetrating the side walls of the fire pot, with the distributing-bulbs or chambers $D^1$, and the transverse pipe G, substantially as and for the purpose described.

H. F. HAYDEN.

Witnesses:
  ALEXANDER MAHON,
  J. M. YZNAGA.